W. H. GREEN.
WATER TREATING APPARATUS.
APPLICATION FILED DEC. 17, 1910.

1,019,784.

Patented Mar. 12, 1912.

2 SHEETS—SHEET 1.

Witnesses

Inventor
Walter H. Green
By Chamberlin Frederick
Att'y.

W. H. GREEN.
WATER TREATING APPARATUS.
APPLICATION FILED DEC. 17, 1910.
1,019,784.
Patented Mar. 12, 1912.
2 SHEETS—SHEET 2.
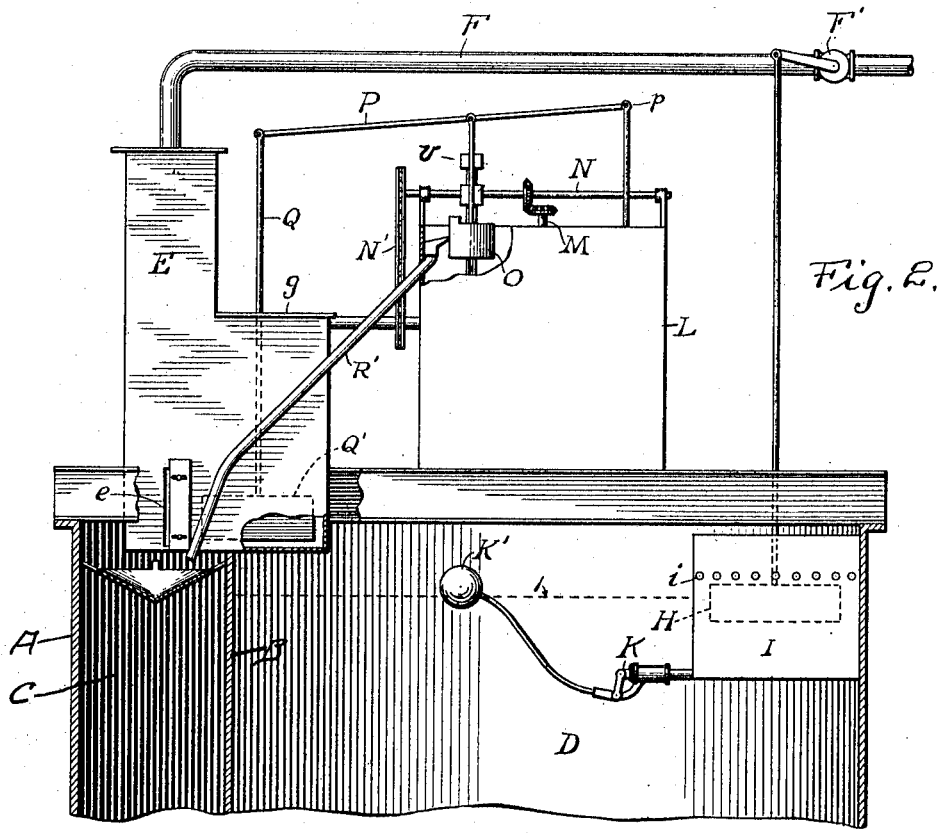
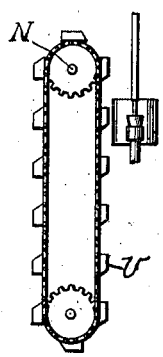
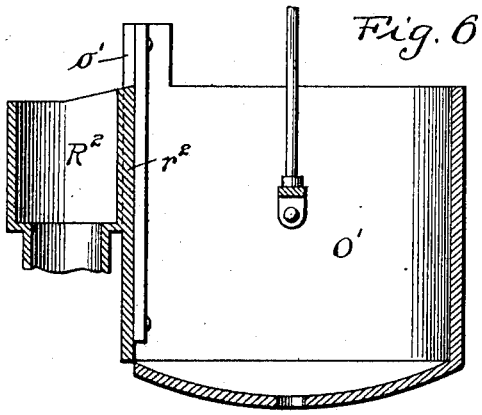

UNITED STATES PATENT OFFICE.

WALTER H. GREEN, OF CHICAGO, ILLINOIS, ASSIGNOR TO NORTHERN WATER SOFTENER COMPANY, OF MADISON, WISCONSIN, A CORPORATION OF MAINE.

WATER-TREATING APPARATUS.

1,019,784. Specification of Letters Patent. Patented Mar. 12, 1912.

Application filed December 17, 1910. Serial No. 597,800.

*To all whom it may concern:*

Be it known that I, WALTER H. GREEN, a citizen of the United States, residing at Chicago, county of Cook, State of Illinois, have invented a certain new and useful Improvement in Water-Treating Apparatus, and declare the following to be a full, clear, and exact description of the same, such as will enable others skilled in the art to which it pertains to make and use the same, reference being had to the accompanying drawings, which form a part of this specification.

My invention has for its object to produce a simple and reliable apparatus for treating water which is supplied either at a constant rate or at a variable rate.

A further object of my invention is to produce a water treating apparatus in which the rate at which water is supplied will be gradually decreased as the rate of consumption decreases, without reducing the rate at which the water is supplied to a point where the reliability of operation of the apparatus will be endangered; thereafter causing the water to be supplied at a uniform rate until the rate of consumption falls to a point where it is desirable to shut off the supply entirely; thereafter keeping the supply shut off until it is again desirable to start the inflow of water and, when this point is reached, causing a sufficient inflow of water to take place to make the apparatus work efficiently and effectively.

Figure 1:
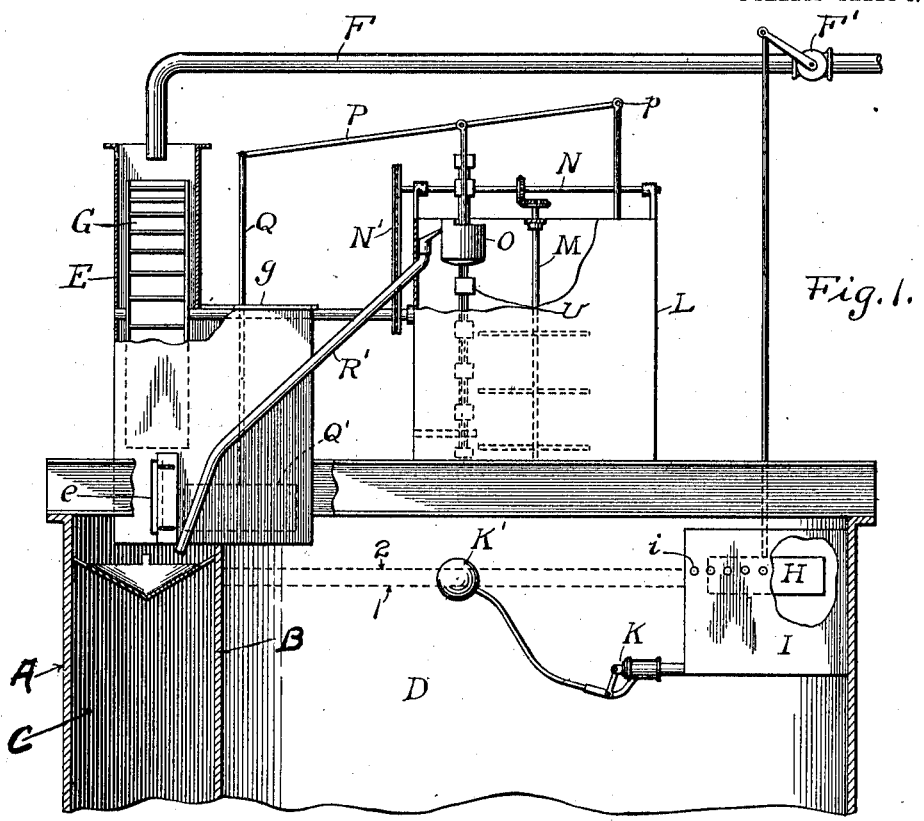
Figure 3:
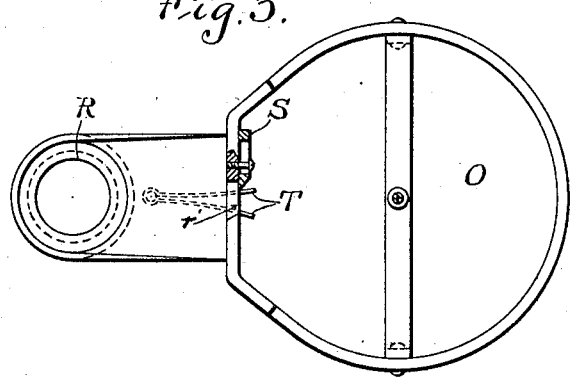
Figure 4:
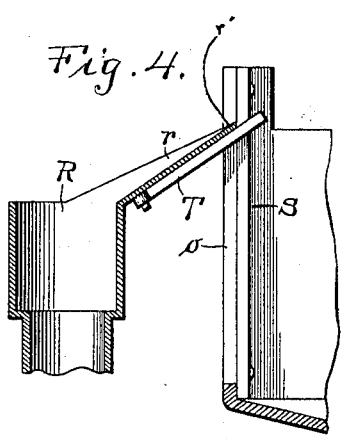

The various features of novelty whereby my invention is characterized will hereinafter be pointed out with particularity in the claims; but for a full understanding of my invention and of its objects and advantages, reference may be had to the following detailed description taken in connection with the accompanying drawings, wherein:

Figure 1 is a view partly in section of an apparatus arranged in accordance with a preferred form of my invention, only a fragment of the storage tanks being shown; Fig. 2 is a view similar to Fig. 1, showing a different condition of the parts; Fig. 3 is a plan view, on an enlarged scale, of the chemical-delivering bucket and the member for receiving the chemical therefrom; Fig. 4 is a vertical section through the bucket and the receiving member of Fig. 3; Fig. 5 is a view looking toward the right in Fig. 1 showing the bucket and the conveyer for supplying the chemical to the bucket; and Fig. 6 vertical section through the center of a modified arrangement of bucket and receiving member.

Referring to the drawings, A represents a large reservoir illustrated as having therein a vertical partition B so as to divide the reservoir into a down-take chamber C and a chamber D the upper portion of which constitutes a storage chamber. These parts may take any usual or preferred forms and will therefore not be described in detail.

E is a water wheel casing mounted upon the reservoir and having a weir $e$ for delivering water into the chamber C.

F is a water supply pipe and G is a water wheel in the casing E adapted to be rotated by water flowing into the casing from the supply pipe. The water wheel is used for operating an agitator in the chemical tank and for driving a portion of the chemical delivery mechanism, as will be hereinafter described. It is of course understood that the treated water is withdrawn from the storage chamber as required, the rate of withdrawal being in almost every installation at a variable rate ranging from nothing to the maximum capacity of the apparatus. Consequently the rate at which water to be treated is supplied must be variable. The water may be supplied in either of two ways: first by permitting it to flow at full rate or to be shut off entirely; and second by varying the rate with the demand, only shutting off the supply entirely when the demand falls below a predetermined minimum. The latter method of controlling the supply of water has the advantage that it permits more nearly continuous operation of the apparatus and of the pumps or the like which are used in connection with it. There has heretofore been the disadvantage in apparatuses to which the water is supplied at a variable rate, that the inflow of water is insufficient at times to turn the water wheel properly and therefore the chemical will not be sufficiently agitated or supplied in proper proportions. I overcome this fault by gradually varying the inflow of water between a full flow and one which is still sufficient to drive the water wheel properly, then shutting off the supply entirely if the demand continues too small. In other words, I provide means for causing the water to be supplied either at a rate sufficient to make the apparatus reliable or not at all. To this end I provide the supply pipe with a controlling valve F′ and connect it with a float H arranged in a float chamber I in the upper end of the chamber D. The float chamber is provided with inlet ports $i$ at the high water level in the storage chamber; and it is also provided with a valve controlled inlet port at a lower point therein.

K indicates the valve controlling the lower port, and K′ is a float lying in the storage chamber and connected to the valve. The parts are so proportioned that the valve K closes when the water in the storage chamber reaches the level indicated by the dotted line 1 in Fig. 1, this level being somewhat below the high water level indicated by the dotted line 2. Consequently when the storage chamber is being filled, the float remains in its lowermost position, leaving the valve F fully open, until the water in the storage chamber reaches the valve K. Thereupon the water rises alike in the storage chamber and in the float chamber, the float rising and gradually closing the valve F′. The float continues to rise and the valve F′ to close until the water in the storage chamber reaches the level of line 1, whereupon the valve K is closed and the float H and valve F′ remain stationary, permitting the water to be supplied at the minimum rate. If the consumption continues less than the supply, the water in the storage chamber continues to rise and, when it reaches the level of line 2, there is a sudden inrush of water into the float chamber through the ports $i$ and the float H is suddenly lifted and closes the valve F′ completely. The supply of water being stopped, consumption at any rate will cause the water level to fall in the storage chamber; but, because the valve K is still closed, the float A will remain at its highest limit until the water in the storage chamber falls slightly below the level of line 1, whereupon the valve K is opened and there is a sudden rush of water out of the float chamber which brings the water within and without the chamber to the same level. This permits the float H to drop into the position indicated in Fig. 2, causing the valve F′ to be partially opened. If the demand increases, causing the water in the storage chamber to recede, the float H falls and gradually widens the opening in the main valve. It will thus be seen that I provide means for varying the rate at which water is supplied to suit the demand, without supplying water at such a low rate that the apparatus will become ineffective.

L is a chemical-containing tank mounted upon the main reservoir.

M is an agitator in the chemical tank which is geared to a counter shaft N extending across the top of the chemical tank and driven from the shaft $g$ of the wheel by means of a sprocket chain N′. These parts may of course take any other usual or preferred form since they of themselves constitute no part of the present invention.

O is a chemical-delivering bucket movably arranged in the upper end of the chemical tank. In the arrangement shown this bucket is suspended from an arm P which is pivoted at one end to a fixed support as indicated at $p$ and which is connected at its other end to the upper end of a float rod Q. The float rod is carried by a float Q′ arranged in the wheel casing E.

U is a suitable conveyer, illustrated as a bucket conveyer arranged within the chemical tank and driven from the shaft N; the conveyer being arranged beside the bucket O so that in operation it lifts the chemical liquid from the chemical tank and pours it into the delivery bucket O. In the arrangement shown in the first five figures of the drawings, the delivery bucket has a narrow vertical discharge slot $o$ extending down one side thereof.

R is a chemical-receiving member having a platform or table $r$ extending into proximity to the slot in the bucket, the member $r$ being preferably wider than the slot and having a reduced portion $r'$ which extends into the slot and engages with the sides thereof.

R′ is a pipe leading from the member R into the chamber C for the purpose of conveying the chemical into this chamber simultaneously with the delivery of water from the weir $e$.

The parts are so proportioned that whenever the water wheel is in action the delivery bucket is supplied with sufficient chemical for the needs of the apparatus. This is conveniently accomplished by causing an excess of chemical to be delivered to the bucket so that the chemical will always be overflowing at the top of the bucket. The parts are also so proportioned and arranged that when the supply of water is shut off so that there is no flow through the weir $e$, the float Q′ drops low enough to bring the receiving end of the member $r$ very slightly above the overflow level of the bucket O. Consequently there can be no flow from the bucket to the chemical-receiving member. As soon as water is turned on, the float $q'$ rises and lifts the bucket O. This brings the receiving end of the member $r$ below the overflow level of the chemical bucket and therefore chemical begins to flow out of the bucket into the receiving member R and into the treating compartment or chamber of the apparatus. As the flow of water to the apparatus increases, the level in the casing E rises, producing a corresponding upward movement in the float Q′ and elevating the chemical bucket still farther. Thus the length of the slot in the chemical bucket above the receiving table or platform is varied as the inflow of water varies and consequently the delivery of the chemical, which depends upon the effective length of the slot above the receiving table, is proportioned to the flow of water. As long as the chemical is supplied to the delivery bucket it flows out of the slot at a constant rate, this rate being independent of the elevation of the bucket. It will be seen that as the bucket rises and falls the member $r'$ acts as a scraper which will remove any deposit of chemical which may have taken place at the sides of the discharge slot and consequently the accuracy of the measurement by means of the slot will not be destroyed. It may be desirable to vary the width of the discharge slot as the conditions of service vary and therefore I have provided an adjustable gate S which is secured within the delivery bucket at the sides of the slot and is adapted to be moved back and forth to vary the effective width of the slot. In this arrangement the table $r$ may be provided with a spring finger T which projects through the slot and engages with the edge of the gate. When the gate is adjusted the resiliency of the finger permits the same to follow the gate, maintaining it at all times in the proper position to scrape along the edge of the gate and keep the same clean. It will thus be seen that I have provided means for delivering the chemical in accurate quantities regardless of the rate at which the water is flowing into the apparatus.

In Fig. 6 I have shown a slightly modified form of chemical bucket $O'$ and chemical-receiving member $R^2$. The member $R^2$ has a long tongue $r^2$ which fits within the slot $o'$, closing the entire slot when the bucket is in its lowermost position and uncovering the slot only above the mouth of the receiving member when the bucket rises.

While I have illustrated and described with particularity only a single form of my invention I do not desire to be limited to the specific details so illustrated and described; but intend covering all constructions and arrangements which fall within the terms employed in the definitions of my invention constituting the appended claims.

What I claim is:

1. In a water treating apparatus, a reservoir for treated water, means governed by the water in the reservoir for causing water intended to be treated to be supplied at a gradually varying rate as the water in the reservoir rises to or falls from a predetermined lower level and at a constant rate while the water level remains between said lower level and a predetermined higher level.

2. In a water treating apparatus, a reservoir for treated water, and means governed by the water in the reservoir for causing water intended to be treated to be supplied at a gradually decreasing rate as the water in the reservoir rises to a predetermined level and at a constant rate as the water rises from said level to a predetermined higher level.

3. In a water treating apparatus: a reservoir for treated water; and means governed by the water in the reservoir for causing water intended to be treated to be supplied at a gradually decreasing rate as the water in the reservoir rises to a predetermined level and at a constant rate as the water rises from said level to a predetermined higher level, and for causing the supply to be shut off when the water in the reservoir reaches said higher level.

4. In a water treating apparatus, a reservoir for treated water, a supply pipe, a valve in said pipe, and a controller for said valve governed by the water in the reservoir for causing said valve to close gradually as the water in the reservoir rises to a predetermined level and thereafter maintain a uniform valve-opening as the water rises from said level to a predetermined higher level.

5. In a water treating apparatus: a reservoir for treated water; a supply pipe; a valve in said pipe; and means governed by the water in the reservoir for gradually closing the valve as the water rises in the reservoir to a predetermined level, maintaining a uniform valve opening while the water rises from said level to a predetermined higher level, and causing the valve to close when the water reaches said higher level.

6. In a water treating apparatus, a reservoir for treated water, a supply pipe, a valve in said pipe, a receptacle in the upper portion of said reservoir, a float in said receptacle, a connection between said float and said valve for causing said valve to open and close as the float falls and rises, a valve controlling a port in the receptacle, a float located in said reservoir and controlling the latter valve and arranged to close the same after the water level has risen sufficiently to cause the valve in the supply pipe to be partially closed, said receptacle having one or more inlet ports above the aforesaid port at a level above the water level in the reservoir which causes the valve in the receptacle to close.

7. In a water treating apparatus: a reservoir for treated water; mechanism governed by the water in the reservoir for causing water to be supplied at a gradually decreasing rate as the water in the reservoir rises to a predetermined level and at a constant rate as the water rises from said level to a predetermined higher level, for shutting off the supply of water when the level in the reservoir reaches said higher level, and for maintaining the supply shut off until the water in the reservoir again falls to the first mentioned level.

8. In a water treating apparatus receiving water at a variable rate, a bucket having a vertical discharge slot, a chemical-receiving member lying adjacent to said slot, means for delivering to said bucket chemical liquid, and means dependent upon the rate at which water is received for raising and lowering the bucket to vary the length of the slot above said member.

9. In a water treating apparatus receiving water at a variable rate, a bucket having a vertical discharge slot, a stationary chemical-receiving member lying adjacent to said slot, means for delivering to said bucket chemical liquid, and means dependent upon the rate at which water is received for raising and lowering the bucket to vary the length of the slot above said member.

10. In a water treating apparatus receiving water at a variable rate, a bucket having a vertical slot in one side thereof, a chemical-receiving member having a portion extending into said slot, means for supplying an excess of chemical liquid to said bucket, and means governed by the rate at which water is received for raising and lowering the bucket to vary the length of the slot above said member.

11. In a water treating apparatus, receiving water at a variable rate, a bucket having a delivery outlet for delivering a chemical liquid, means for raising and lowering the bucket and simultaneously lengthening and shortening said delivery outlet as the rate at which the water is received increases and decreases, and means for supplying the chemical liquid in sufficient quantities to maintain said bucket approximately full.

12. In a water treating apparatus receiving water at a variable rate, a casing having a weir for delivering water, a float in said casing, a bucket having a vertical slot in one side thereof, a chemical-receiving member extending into proximity to the slot in the bucket, a connection between said float and said bucket for causing the latter to rise and fall as the water level in the casing rises and falls, and means for supplying a chemical to said bucket in sufficient quantities to maintain the bucket approximately full.

13. In a water treating apparatus receiving water at a variable rate, a bucket having a delivery outlet for delivering a chemical liquid, means for raising and lowering the bucket and simultaneously lengthening and shortening said delivery outlet as the rate at which the water is received increases and decreases, and means for supplying the chemical liquid to the bucket in sufficient quantities to maintain and overflow at a point at least as high as the highest effective point in the delivery outlet.

14. In a water treating apparatus, a bucket having a vertical slot for delivering a chemical, a receiving member having a portion extending into the slot and engaging the sides thereof so as to act as a scraper, and means for producing relative vertical movements between said member and said bucket.

15. In a water treating apparatus, a bucket having a vertical slot for delivering a chemical, a stationary receiving member having a portion extending into the slot and engaging the sides thereof so as to act as a scraper, and means for raising and lowering the bucket.

16. In a water treating apparatus, a chemical-delivering bucket having a vertical slot, an adjustable gate mounted on the bucket for varying the width of said slot, a chemical-receiving member having a portion extending into said slot and engaging the sides thereof so as to act as a scraper, a spring finger mounted on said member and engaging with the edge of said gate for the purpose of cleaning the same, and means for producing relative vertical movements between said member and said bucket.

17. In a water treating apparatus receiving water at a variable rate, a bucket having a vertical discharge slot, a chemical-receiving member extending into proximity to said slot, means for delivering chemical liquid to said bucket, and means dependent upon the rate at which water is received for producing relative movements between said bucket and said member to vary the length of the slot above said member.

18. In a water treating apparatus receiving water at a variable rate, a bucket having a vertical discharge slot, a chemical-receiving member extending into proximity to said slot, means for delivering chemical liquid to said bucket, and means dependent upon the rate at which water is received for producing relative movements between said member and said bucket so as to alter the position of said member relative to said slot and vary the proportion between the liquid which flows out of the slot above said member and that which flows out of the slot below said member.

In testimony whereof, I sign this specification in the presence of two witnesses.

WALTER H. GREEN.

Witnesses:
 RUBY V. BRYDGES,
 WM. F. FREUDENREICH.

---

Copies of this patent may be obtained for five cents each, by addressing the "Commissioner of Patents, Washington, D. C."